United States Patent [19]

Tsai et al.

[11] Patent Number: 5,726,283
[45] Date of Patent: Mar. 10, 1998

[54] CONDUCTIVE POLYESTER SHEET

[75] Inventors: Tsan Hung Tsai; Rong Shiun Pan; Cheng Chung Wu, all of Hsin-Chu; Yuan Hwey Hsu; Jen Hao Wei, both of Hsin-Chu Hsien; Shung Mine Hong, Chang-Hwa, all of Taiwan

[73] Assignee: Far Eastern Textile, LTD., Taipei, Taiwan

[21] Appl. No.: 778,575

[22] Filed: Jan. 3, 1997

[51] Int. Cl.$^6$ .................. B32B 5/16; B32B 7/12; C08G 63/02
[52] U.S. Cl. .................. 528/354; 528/272; 528/300; 528/302; 528/307; 528/308; 528/308.6; 428/221; 428/333; 428/354; 428/409
[58] Field of Search .................. 528/272, 300, 528/302, 307, 308, 308.6; 428/221, 333, 354, 409

[56] References Cited

U.S. PATENT DOCUMENTS

| 4,308,314 | 12/1981 | Nakano et al. | 428/323 |
| 4,746,574 | 5/1988 | Hattori et al. | 428/409 |
| 4,871,613 | 10/1989 | Akao | 428/328 |
| 4,876,129 | 10/1989 | Akao | 428/359 |
| 5,013,606 | 5/1991 | Miyoshi et al. | 428/412 |
| 5,206,482 | 4/1993 | Smuckler | 219/219 |
| 5,208,103 | 5/1993 | Miyamoto et al. | 428/354 |
| 5,346,765 | 9/1994 | Maeda et al. | 428/354 |
| 5,432,145 | 7/1995 | Oshima et al. | 503/227 |
| 5,573,833 | 11/1996 | Imamura et al. | 428/195 |

*Primary Examiner*—Samuel A. Acquah
*Attorney, Agent, or Firm*—Morton J. Rosenberg; David I. Klein; Jun Y. Lee

[57] ABSTRACT

A conductive polyester sheet having three layers, comprising one substrate layer and two surface layers, laminated together by co-extrusion is provided. All the three layers are made from polyester and/or copolyester, and the surface layers further contain carbon black and thus are useful as conductive layers. The sheet has a surface conductivity of not more than $10^8$ ohms and the flow index of the material for the conductive layers during the extrusion step is not lower than 60 g/min (loading, 2160 g; temperature, 275° C.).

7 Claims, No Drawings

CONDUCTIVE POLYESTER SHEET

BACKGROUND OF THE INVENTION

The present invention relates to a conductive polyester sheet having three layers laminated together by co-extrusion, which has a surface resistance of not more than $10^8$ ohms, and is useful for the packaging of IC products and parts.

Most plastics sheets, especially a polyester sheet, are used for the packaging of foods items and industrial products. Recently, since the package material for an IC product is required to have antistatic property (surface resistance reached $10^9$–$10^{11}$ ohms), antistatic polyester sheets are now commercially available. Conventional methods for the production of a antistatic polyester sheet includes, for example, (1) a methods of coating an antistatic agent on the surfaces of a package container, (2) a method of applying a conductive paint to the surfaces of a package container, and (3) a method of incorporating an antistatic agent or a conductive material into the matrix resin.

However, the products prepared by these methods have disadvantages. The disadvantages of method (1) are that the antistatic layers are not durable and tends to be removed by abrasion and water-washing, moreover, the surface resistance is too high, about $10^9$–$10^{12}$ ohms. The disadvantages of method (2) are that the materials which can be used as the vehicles of the paint are critically limited and it is difficult to obtain an even coating. The disadvantages of method (3) are that a considerable amount of conductive materials such as carbon black and metal powders should be incorporated thereinto and thus results in the fluidity of the resin is too bad to be suitable for extrusion. In order to be suitable for extrusion, the resin should be added with a fluidity modifier such as liquid paraffin and a low molecule resin. However, the mechanical strengths, especially impact strength, of the sheets produced are severely reduced. Moreover, the surface resistances of the products obtained from methods (1)–(3) only can reached $10^9$–$10^{11}$ ohms.

SUMMARY OF THE INVENTION

The present invention is to provide a conductive polyester sheet having three layers laminated together by co-extrusion, which is made from polyester and/or copolyester and comprises one substrate layer and two surface layers, wherein the surface layers further contain carbon black and thus are useful as conductive layers. The products prepared according to the present invention are superior to the conventional ones in conductivity or antistativity as well as mechanical strengths and thus are suitable for the packaging of IC products and parts. The surface resistance of the sheet according to the present invention is not more than $10^8$ ohms.

DETAILED DESCRIPTION OF THE PREFERRED EMBODIMENT

As described hereinabove, this invention provides a conductive polyester sheet having one substrate layer and two surface layers, wherein the conductive layers contain carbon black. The amount of carbon black added to each conductive layer ranges from 3 to 25 wt %, and preferably from 9 to 20 wt %. Examples of carbon black which can be used in the conductive layers may contain furnace black and channel black, for example, XC-72 (produced by Cabot Co., Ltd.) and Ketjen Black EC(produced by Akzo Co., Holland).

The total thickness of the conductive polyester sheet may range between 0.1 to 1.0 mm, preferably between 0.1 to 0.8 mm, of the total thickness of the sheet. The flow index of the conductive polyester pellets is 60 g/10 min (loading, 2160 g; temperature, 275° C.). In the production of the conductive polyester sheet according to the present invention, two extruders are used to form the sheet by co-extrusion. Temperatures for the production are: screw rod, 270°–290° C.; die head, 270°–280° C. The temperature for vacuum molding (or pressure molding) the sheet is 130°–160° C.

In the present invention, the polyester and copolyester used each have a intrinsic viscosity of 0.4–1.2. Generally, a disperser and a dispersing assistant agent are compounding into the polyester resin during the production of the conductive polyester resin particles to uniform the resulting mixture. For the purpose of dispersion, the disperser agent and dispersing assistant agent should be very compatible with the polyester and copolyester and can wet the carbon black during the compounding procedure in order that the agglomeration of carbon black can be reduced.

In the formulation of the conductive polyester pellets used for producing the sheet according to the present invention, a modified copolyester which is an oligomer or high molecular polymer is employed as the disperser, the intrinsic viscosity thereof being 0.2–0.7, the molecular weight being 200–25,000, the softening point being 30°–120° C., and the amount added being 0–40wt % based on the total weight of the mixture for the pellets.

In the formulation of the conductive polyester pellets, as ethylene-vinyl acetate copolymer in a suitable amount is used as the dispersing assistant agent, the melting point thereof being 87°–92° C., and the amount added being 0–10 wt % of the mixture for the pellets.

More specifically, the conductive layers each contain:

(a) 25–97 wt % of a polyester or copolyester resin;

(b) 0.1–40 wt % of a copolyester as the disperser and/or 0.1–10 wt % of an ethylene-vinyl acetate copolymer as the dispersing assistant agent; and (c) 3–25 wt % of carbon black.

The total thickness of the conductive layers may range from 2 to 80%, preferably from 3 to 35%, of the total thickness of the sheet which having three layers.

The polyester used in this invention is a homopolymer such as, for example, polybutylene- terephthalate, polyethylene- terephthalate, polycyclohexane dimethylene-terephthalate, and the copolyester formed by the reaction of ethylene glycol, terephthalic acid and at least one other diol and/or dicarboxylic acid, wherein:

(a) the diol is selected from the group consisting of 1,4-butanediol, 1,5-pentanediol, 1,6-hexanediol, diglycol, 1,4-dimethylol cyclohexane, 3-methylpentanediol, and 2-methyl- hexanediol; and (b) the dicarboxylic acid is selected from the group consisting of: malonic acid, succinic acid, glutaric acid, adipic acid, pimelic acid, suberic acid, azelaic acid, sebacic acid, cyclohexanecarboxylic acid, and isophthalic acid.

The copolyester used as the disperser according to the invention is synthesized by the reaction of ethylene glycol, terephthalic acid and at least one other diol and/or dicarboxylic acid, wherein:

(a) the diol is selected from the group consisting of 1,4-butanediol, 1,5-pentanediol, 1,6-hexanediol, diglycol, 1,4-dimethylol cyclohexane, 3-methylpentanediol, and 2-methyl- hexanediol; and (b) the dicarboxylic acid is selected from the group consisting of: malonic acid, succinic acid, glutaric acid, adipic acid, pimelic acid, suberic acid, azelaic acid, sebacic acid, cyclohexanecarboxylic acid, and isophthalic acid.

In the process for preparing the conductive polyester pellets, said polyester and/or copolyester, disperser and dispersing assistant agent are respective metered and compounded into a extruder with twin-screw, molded, melted, pelletized, and then a conductive polyester sheet is produced by co-extrusion.

The invention are further explained by reference to the following illustrative Examples.

EXAMPLE 1

100 parts of a polyethylene-terephthalate (PET, No. CB-602, available from Far East Textile CO., Taiwan, intrinsic viscosity (IV) of 0.80, measured in a mixture of phenol (60 wt %) and tetrachloroethane (40 wt %)), 22 parts of a copolyester as the dispersing agent (CSS119, available Far East Textile Co.,intrinsic viscosity of 0.54), 4 parts of a ethylene-vinyl acetate copolymer (EVA, No. EVAL available from BASF Co., Germany, melting point of 87°–92° C.) and 20 parts of carbon black (No. XC-72, available Cabot Co.) were feeded through volumetric meters respectively to a twin-screw extruder of 54 mm$\phi$ (L/D=36), melted and then pelletized into conductive pellets. The output of said extruder was 100 Kg/hr, the pressure of the die head was maintain at 3–6 Mpa, and the temperature of each hot zone was held at 220°–270° C. Since the pressure of the die head was duly controlled, the plastics strand were uniformly and smoothly extruded out so that the conductive polyester pellets having a mean diameter and a mean length of about 3 mm respectively were obtainable.

After the conductive polyester pellets were dried to an extent that the moisture contained had been below 50 ppm, they were supplied to a sub-extruder at the shell of a Barmag co-extruder and extruded through a T-DIE head (temperature controlled at 285° C.) to form two layers as the surface layers. In the meantime, copolyester pellets (No. FF207, intrinsic viscosity of 0.75, available from Far East Textile Co.) were supplied to the main-extruder at the core of the same Barmag co-extruder and extruded through the same T-DIE head to, form one layer as the substrate layer, which is between the two surface layers. The co-extruder was provided with a manifold device to ensure that the three layers were effectively separated, and the three layers were intimately laminated together when they ran out through the T-DIE head. The T-DIE head had a width of 1,380 mm and an exit gap of 0.8 mm. A three-layer sheet having a thickness of 0.32 mm was obtained, wherein the substrate layer was found to have a thickness of 0.22 mm and the two surface layers each were found to have a thickness of 0.05 mm.

The test results of the conductive three-layer polyester sheet, as showed in Table 1, demonstrated that the surface resistance and the impact strength thereof were satisfactory.

For understanding the vacuum molded property of the sheet, it was molded by vacuum at 140° C. for 2 seconds to give a completely molded product. The resulting product was tested for surface resistance and the results were excellent, which showed that no increased surface resistance was observed after molded by vacuum. In other words., the surface resistance thereof was not affected by the molding of vacuum.

EXAMPLE 2

Similar composition and procedures were repeated as in Example 1, but in the absence of the EVA. The composition and test results are shown in Table 1.

EXAMPLE 3

Similar composition and procedures were repeated as in Example 1, with the exception that the 20 parts of carbon black was replaced by 30 parts and the copolyester (as the disperser) and the EVA was absent. It was found that the surface resistance thereof was increased after the vacuum molding. The composition and test results are shown in Table 1.

EXAMPLE 4

Similar composition and procedures were repeated as in Example 1, with the exception that PET polyester contained in the conductive layers was replaced by the copolyester (No. FF207, a product of Far East Textile Co. intrinsic viscosity of 0.75). The composition and test results are shown in Table 1.

EXAMPLE 5

Similar composition and procedures were repeated as in Example 1, with the exception that the PET polyester contained in the conductive layers was replaced by the copolyester (No. PETG 6763, a product of Eastman). The composition and test results are shown in Table 1.

EXAMPLE 6

Similar composition and procedures were repeated as in Example 1, with the exception that the 20 parts of carbon black was replaced by 7 parts of Ketjen Black EC carbon black (No. EC 600, a product of Akzo Co.). The composition and test results are shown in Table 1.

COMPARATIVE EXAMPLE 1

The conductive polyester pellets as used in Example 1 were dried to an extent that the moisture content thereof was below 50 ppm. A one-layer sheet was produced under the general procedures outlined in Example 1. The sheet produced was found to have a thickness of 0.32 mm, and the impact strength thereof was decreased and thus became brittle. The composition and test results are shown in Table 1.

COMPARATIVE EXAMPLE 2

Similar composition and procedures were repeated as in Comparative Example 1, with the exception that the 20 parts of carbon black was replaced by 30 parts and the PET polyester was replaced by copolyester (No. FF207, a product of Far East Textile Co.). The composition and test results are shown in Table 1.

The foregoing disclosure and description of the invention is illustrative and explanatory thereof, and various changes and modifications may be made therein without departing from the invention. All such changes and modifications are intended to be within the spirit and scope of this invention.

TABLE 1

|  | Ex. 1 | Ex. 2 | Ex. 3 | Ex. 4 | Ex. 5 | Ex. 6 | Com. Ex. 1 | Com. Ex. 2 |
|---|---|---|---|---|---|---|---|---|
| Composition | | | | | | | | |
| Conductive Layer | | | | | | | | |
| PET | 100 | 100 | 100 | 0 | 0 | 100 | 100 | 0 |
| Copolyester | 0 | 0 | 0 | 100 | 100 | 0 | 0 | 100 |
| Carbon Black | 20 | 20 | 30 | 30 | 45 | 7 | 20 | 30 |
| Copolyester (as disperser) | 22 | 22 | 0 | 22 | 22 | 22 | 22 | 22 |
| EVA | 4 | 0 | 0 | 4 | 4 | 4 | 4 | 4 |
| Substrate Layer | | | | | | | | |
| Copolyester | 100 | 100 | 100 | 100 | 100 | 100 | — | — |
| Test Results | | | | | | | | |
| Flow Index (g/10 min) <Conductive> | 82 | 77 | 46 | 73 | 61 | 68 | 81 | 74 |
| Surface Resistance (ohm) | $2 \times 10^5$ | $4 \times 10^6$ | $1 \times 10^8$ | $5 \times 10^4$ | $1 \times 10^4$ | $3 \times 10^5$ | $1 \times 10^5$ | $5 \times 10^4$ |
| Impact Strength (g-mm) | 470 | 420 | 180 | 310 | 40 | 220 | 38 | 8 |
| Surface Resistance (ohm) <afte vacuum molded> | $6 \times 10^5$ | $7 \times 10^8$ | $2 \times 10^9$ | $6 \times 10^4$ | $2 \times 10^4$ | $1 \times 10^6$ | $5 \times 10^5$ | $6 \times 10^4$ |

We claim:

1. A conductive polyester sheet having three layers, comprising one substrate layer and two surface layers laminated together by co-extrusion, all the three layers being made from polyester and/or copolyester, the surface layers further containing carbon black and acting as conductive layers, said conductive layers each containing:

(a) 25–97 wt % of a polyester or copolyester resin, (b) 0.1–40 wt % of a copolyester as a disperser and/or 0.1–10 wt % of an ethylene-vinyl acetate copolymer as a dispersing assistant agent; and (c) 3–25 wt % of carbon black, said sheet having a surface resistance of not more than 10 ohms and a thickness ranging from 0.1 to 1.0 mm, the conductive layers having a total thickness of 2–80% of total of the sheet and each having a flow index of not lower than 60 g/min (loading, 2160 g; temperature, 275° C.) during the extrusion step.

2. The conductive polyester sheet of claim 1, wherein the polyester and copolyester each have an intrinsic viscosity of between 0.4–1.2 and a melting point of between 200°–330° C., the polyester is a homopolymer and the copolyester is synthesized by reaction of ethylene glycol, terephthalic acid and at least one other diol and/or dicarboxylic acid:

(i) the diol being selected from the group consisting of 1,4-butanediol, 1,5-pentanediol, 1,6-hexanediol, diglycol, 1,4-dimethylol cyclohexane, 3-methyl-pentanediol, and 2-methyl-hexanediol; and (ii) the dicarboxylic acid being selected from the group consisting of: malonic acid, succinic acid, glutaric acid, adipic acid, pimelic acid, suberic acid, azelaic acid, sebacic acid, cyclohexanecarboxylic acid, and isophthalic acid.

3. The conductive polyester sheet of claim 1, wherein the copolyester in (b) has an intrinsic viscosity of between 0.2–0.7 and a melting point of between 30°–120° C., and said copolyester is synthesized by reaction of ethylene glycol, terephthalic acid and at least one other diol and/or dicarboxylic acid;

(i) the diol being selected from the group consisting of 1,4-butanediol, 1,5-pentanediol, 1,6-hexanediol, diglycol, 1,4-dimethylol cyclohexane, 3-methyl-pentanediol, and 2-methyl-hexanediol; and (ii) the dicarboxylic acid being selected from the group consisting of: malonic acid, succinic acid, glutaric acid, adipic acid, pimelic acid, suberic acid, azelaic acid, sebacic acid, cyclohexanecarboxylic acid, and isophtalic acid.

4. The conductive polyester sheet of claim 1, wherein said ethylene-vinyl acetate copolymer has a melting point of between 80°–100° C.

5. The conductive polyester sheet of claim 2, wherein said homopolymer is polybutylene-terephthalate.

6. The conductive polyester sheet of claim 2, wherein said homopolymer is polyethylene-terephthalate.

7. The conductive polyester sheet of claim 2, wherein said homopolymer is polycyclohexane dimethylene-terephthalate.

* * * * *